United States Patent Office 3,242,518
Patented Mar. 29, 1966

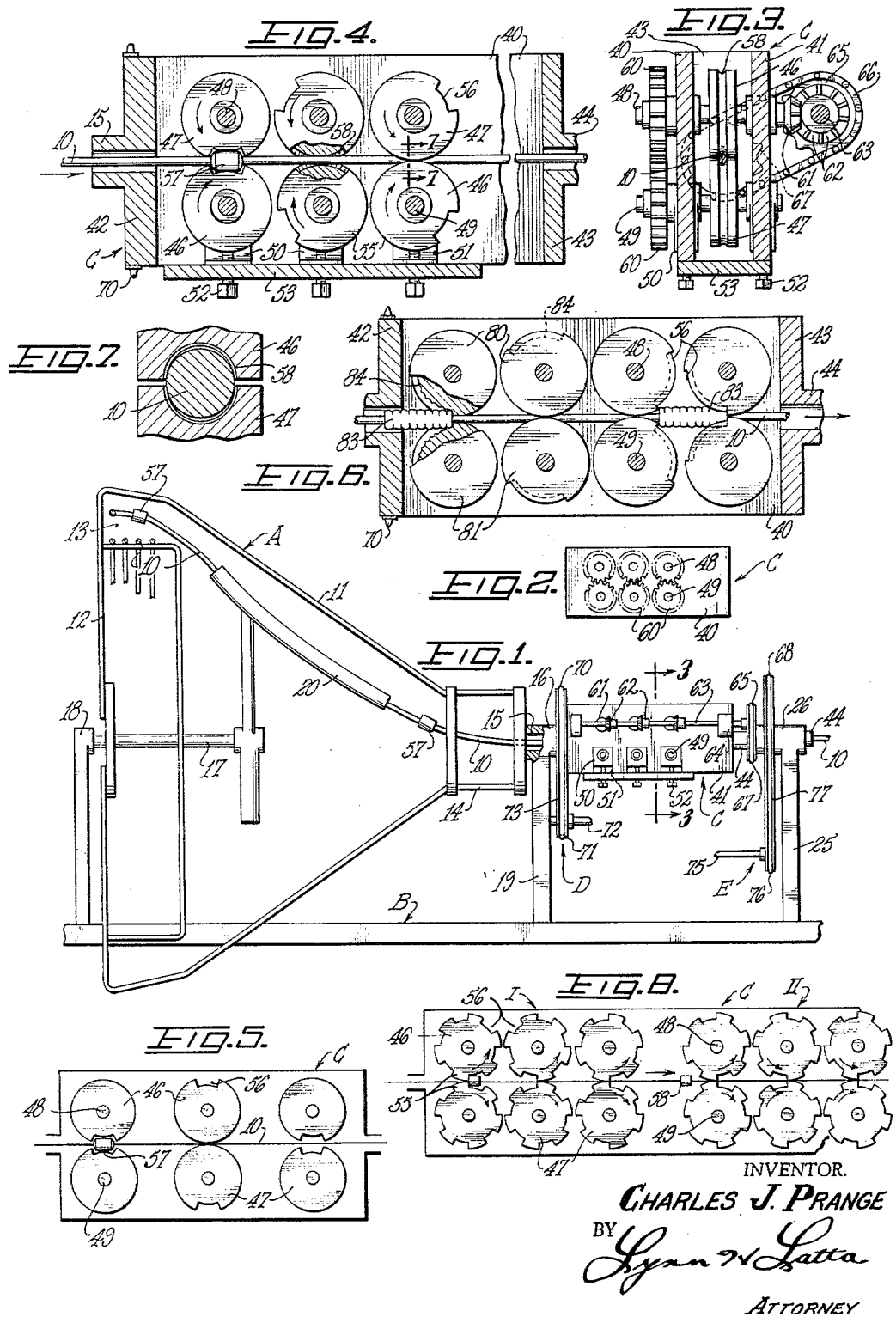

3,242,518
APPARATUS FOR FEEDING JOINTED SEWER
CLEANING TOOL DRIVING ROD
Charles J. Prange, Lima, Ohio, assignor to Flexible Sewer-
tool Corporation, Lima, Ohio, a corporation of Ohio
Filed Mar. 29, 1965, Ser. No. 443,389
18 Claims. (Cl. 15—104.3)

This invention relates to apparatus of the type commonly referred to as "sewer-rodding" apparatus, used in the simultaneous rotating and feeding of flexible drive rod having at its forward end a rotating sewer pipe cleaning tool. Such apparatus most commonly utilizes a reel of one type or another in which flexible drive rod is stored and coiled, together with power operated means for rotating the drive rod as it is fed out or retracted into the reel, and independently operable power driven means for transmitting feeding movements to the drive rod for projecting it into a sewer line or retracting it therefrom. The present invention relates specifically to the feeding mechanism and has as its general object to provide a roll type feed unit which is operable for feeding jointed drive rod. More specifically, the invention contemplates a feed unit embodying a plurality of pairs of counter-rotating rolls which grip the drive rod between them and feed it linearly in one direction or the other for projecting it into a sewer line or retracting it therefrom.

A further object is to provide such a drive rod feed apparatus adapted to simultaneously transmit linear feed and rotation to the drive rod.

Other objects and advantages will become apparent in the ensuing specification and appended drawing in which:

FIG. 1 is a side elevational view of a drive rod rotating and feeding apparatus embodying the improved feed unit of my invention in combination with a drive rod storage reel which is shown schematically;

FIG. 2 is a fragmentary elevational view of the feed unit viewed from the side opposite the side viewed in FIG. 1;

FIG. 3 is a transverse sectional view of the feed unit taken on the line 3—3 of FIG. 1;

FIG. 4 is a longitudinal sectional view of the feed unit;

FIG. 5 is a schematic longitudinal sectional view of a modified form of the feed unit;

FIG. 6 is a fragmentary longitudinal sectional view of another modified form of the feed unit;

FIG. 7 is a detailed fragmentary sectional view taken on line 7—7 of FIG. 4; and FIG. 8 is a schematic longitudinal sectional view of another modified form of the feed unit.

Referring now to the drawing in detail, and in particular to FIG. 1, I have shown therein, merely by way of example of one type of reel-feed sewer-rodding machine in which the invention may be embodied, an apparatus utilizing a rod storage reel A of a conical cage type, mounted upon the chassis B of a truck or trailer vehicle by means of which the machine may be transported to and from a job; the improved feed unit of my invention, indicated generally at C, mounted at the apex end of reel A and coupled thereto for conjoint rotation therewith; a drive D for rotating the feed unit C; and a drive unit E for transmitting feeding drive thereto.

The rod storage reel A may be generally of the type disclosed in my Patent No. 3,130,432 for Sewer Rod Feed Reel issued April 28, 1964, or may be any equivalent reel having means for storing a sewer tool drive rod 10 and for feeding the same into the feed unit C. The reel schematically shown herein by way of example is of the type embodying a conical cage 11 having a spoked large end 12 providing a rod storage chamber 13 in which the rod 10 is stored as indicated; having a relatively small diameter apex end 14 terminating in a tubular throat or nozzle 15 which is journalled in a suitable bearing 16 carried by chassis B, the guide rod 10 being guided through the throat 15 into the feed unit C along the longitudinal axis thereof. The large end 12 of the reel is supported on an axle 17. Axle 17 and throat bearing 16 are supported on suitable supports 18 and 19 carried by chassis B. The drive rod 10 is guided from the storage space 13 to the throat 15 by a suitable guide 20 freely rotatable on the forward end of axle 17.

Chassis B is provided with another upright support 25 having at its upper end a bearing 26 which is coaxial with bearing 16 and spaced therefrom so as to support the feed unit C between the two bearings.

Feed unit C comprises a housing structure of spaced side plates 40 and 41 secured, in laterally spaced relation, to respective end plates 42 and 43 which are carried by respective tubular trunnions one of which can be the throat 15 of reel A. The other trunnion 44 is journalled in the bearing 26. Thus, the feed unit C is journalled for rotation on its longitudinal axis (the common axis of bearings 16 and 26) and the drive rod 10 passes longitudinally through the drive unit and emerges from the trunnion 44 to enter a sewer.

Journalled between side plates 40 and 41 are a plurality of pairs of feed rolls 46 and 47. The rolls 46 are arranged on one side of the longitudinal feed axis, on shafts 48 which are journalled in bearings fixed in the respective side plates 40 and 41. The rolls 47 are mounted on shafts 49 which are journalled in bearings 50 that are adjustably mounted in recesses 51 in the respective side plates 40, 41 and are engaged by loading screws 52 threaded through a bar 53 bridging over the recesses 51 and secured to the margins of the side plates 40, 41. Screws 52 are operable to place the series of rollers 47 under compression such as to clamp the sections of drive rod 10 between the pairs of rolls. The rolls 46 and 47 are provided with circumferentially registering segmental-circular peripheral jaws 55 interrupted by peripheral gaps 56, the latter being adapted to receive the couplings 57 by which the sections of rod 10 are coupled to one another. The jaws 55 are provided with toroidal peripheral grooves 58 having roughened or serrated surfaces adapted to establish non-slipping grip upon the sections of rod 10.

The rolls 46, 47 of the succeeding pairs are arranged with gaps 56 in rotatably indexed relation to one another such as to bring the gaps successively into registration with a coupling 57 traveling between the feed rolls. The rotational displacement of the gaps, in the direction of rotation, in successive pairs of rolls may be varied in accordance with the spacing of the rolls along the feed axis. In the arrangement shown in FIG. 4, the spacing of the pairs of rolls along the feed axis is equivalent to approximately 1.0472 times the diameter of the rolls 46, 47 (⅓ of circumference) at their peripheries, and the grooves 58 are of slightly smaller width than the diameter of rod 10, and of slightly greater depth, from the axis of the rod, than the rod radius, so as to grip opposite sides of the rod with a wedging grip substantially at the transverse plane of the rod axis, to which the roll peripheries are substantially tangent. At such spacing of the roll axes, their adjacent peripheries are slightly spaced apart, sufficiently to avoid contact, the rate of linear travel of the rod substantially matches the rate of circumferential travel of the rolls at their peripheries (maximum diameter) and the gaps 56 are rotatably indexed approximately 120° between successive pairs of rolls. Other arrangements are possible. Where the rolls are farther apart, the angular displacement of gaps in successive roll pairs is increased.

In the arrangement shown in FIG. 5, the gaps 56 are 180° apart and the spacing between roll axes is equal to approximately 1.5703 times diameter (½ of peripheral circumference). Where, as in FIGS. 4 and 5 there is an open-ended drive arrangement in which only a single coupling passes through the group of rolls at any one time, it is not necessary that the angular displacement of gaps 56 between successive roll pairs be an even fraction of a full circumference, and thus the roll spacing and angular displacement can have values intermediate those specified above. Also, where the spacing is substantially greater than the minimum of 1.0472D specified above, the grooves 58 can be proportioned so as to grip the rod at the bottoms of the grooves, although the wedging grip developed by the arrangement shown in FIG. 7, provides a more certain non-slipping drive.

In the arrangement shown in FIG. 8, two groups of rolls designated I and II are employed. The gaps 56 are preferably indexed 120° apart and there are six pairs of drive rolls alternately driving against two successive couplings, in an arrangement such that a coupling 57 will always be engaged by a pair of rolls in gaps 56, thus providing continuous positive drive from the rolls to the coupling 57. The drive alternates between successive couplings and between successive groups of rolls. The coupling between the first pair of rolls of FIG. 8 is receiving drive from the jaws 55 of that pair of rolls as the succeeding coupling is approaching the first pair of rolls of a second group, and will continue the drive the second pair of rolls commences to drive. The same continuity of drive will be effected in succeeding transistions of drive from one group of rolls to the other. The gaps of the first pair of rolls of group II are indexed 180° behind the gaps of the last pair of rolls of group I and the spacing between the axes of these rolls is the same as in FIG. 5, i.e. equal to 1½ times roll diameter. Gap indexing in group II is 120°, the same as in group I. In this arrangement it is not necessary for the rolls to grip the rod 10.

FIG. 6 illustrates another arrangement in which rolls 80 and 81 drive against couplings 83 and the rod 10 is not gripped by the rolls. Transverse serrations in the peripheral roll grooves 84 are contoured to mate with teeth of circumferential annular ridge or bead form on the couplings 83. The couplings 83 are of extended length such as to bridge between successive pairs of rolls so that the drive from one pair of rolls will be continued at the trailing end of a coupling until the succeeding pair of rolls commences at the leading end of the same coupling. The number of pairs of rolls is determined by the length of the drive rod sections (i.e. the linear spacing of successive couplings) the drive being continued by the last pair of rolls on one coupling until the succeeding coupling is drivingly engaged by the first pair of rolls. Preferably, in the FIG. 6 arrangement, the number of roll pairs is increased to six so that the terminal pair of rolls will be in the same driving position as the third pair from the left as seen in FIG. 6, thus providing for maximum length of the drive rod section.

Referring now to FIG. 2, on one side of the feed unit C (FIG. 2) the shafts 48 and 49 are geared to one another by pairs of spur gears 60. On the opposite side (FIG. 1) the shafts 48 are provided with bevel pinions 61 which are driven by meshing bevel pinions 62 on a common drive shaft 63 journalled in bearings 64 on the side plate 41. Shaft 63 in turn in driven through a chain drive comprising a sprocket 65 on a projecting end thereof, a drive chain 66, and a sprocket 67 which is journalled on the trunnion 44. Sprocket 67 is secured to or integral with a sprocket 68 (FIG. 1) likewise journalled on trunnion 44. Sprockets 65, 67 and 68 in effect constitute a planetary drive, the sprockets 65 orbiting around the longitudinal axis of the feed unit C as the latter is rotated with reel A.

Drive D comprises a sprocket 70 secured to the end plate 42 of the unit C, a sprocket pinion 71 aligned with sprocket 70 on a transmission shaft 72, and a chain 73 providing a driving connection between pinion 71 and sprocket 70. Drive D may be a conventional drive as utilized in connection with a reel such as the reel A in a known rodding machine (e.g. that disclosed in the above mentioned Patent No. 3,130,432). The drive mechanism includes a suitable prime mover (e.g. gasoline engine) and suitable control clutch mechanism controllably transmitting the drive from the engine to the reel and feed unit C for turning the reel and feed unit in unison. Since these elements of the drive mechanism are known in the art they are not shown herein in detail.

Drive mechanism E can likewise include known elements such as gear shift (for changing the speed of feed of the drive rod), clutch for starting and stopping the feed, and suitable connection to the same prime mover which is used to operate the drive D, all in accordance with known practice in the separate driving and controlling of reel-rotating and rod-feeding mechanism. The drive from the change-speed gear and/or the clutch includes a transmission shaft 75, a sprocket pinion 76 thereon, and a drive chain 77 connecting the pinion 76 to the gear 68.

In the operation of the feeding unit as disclosed in FIGS. 4 and 5, reliance is placed upon non-slipping grip of the drive rod sections 10 between the roller jaws 55 in order to maintain proper registering or indexed relation between the drive rod couplings 57 and the gaps 56. Reel A and feed unit C will rotate in unison about the major (feed) axis of the machine when drive is being transmiitted to sprocket 70 through drive D (under operator control). Forward feed as indicated by the horizontal arrows is effected by rotation of rolls 46 and 47 by drive transmitted through drive mechanism E, which is subject to operator control independently of the drive D.

Successive couplings 57 are in each instance (except in FIG. 8) spaced apart a distance equal to or a multiple of the roll circumference at its driving diameter, so as to register with the gaps 56 in succession as they meet the driving rolls. In FIG. 8, the spacing between successive couplings is equal to one and one-sixth times roll circumference and each roll is accordingly provided with a plurality of gaps 60° apart, to accommodate the successive shift in indexing of the successive couplings to roll peripheries. The gripping arrangement of FIG. 7 is employed in FIG. 8.

In each instance the gaps of each succeeding pair of rolls are rotationally indexed behind the gaps of the preceding pair of rolls to an extent which, at the peripheries of the jaws, is equivalent to the distance between succeeding roll centers, whereby a coupling will be received in successive pairs of gaps as it travels between successive pairs of rolls.

I claim:

1. Apparatus for feeding sewer tool drive rod of the sectional type comprising rod sections joined by larger diameter couplings, said apparatus comprising: a pair of peripherally-opposed feed rolls having matching segmental-circular peripheral jaws arranged to apply rolling feed to the rod sections, and having segmental peripheral gaps between the circumferential extremities of said jaws, said feed rolls having a circumference equivalent to an even fraction of the sectional length of said drive rod between coupling centers, whereby succeeding couplings will register with and be received by said gaps as the rod is fed between said rolls; and means for driving said rolls.

2. Apparatus as defined in claim 1, including loading means for pressing said jaws against said rod sections so as to cause said jaws to frictionally engage said rod sections with a non-slipping grip so as to maintain the registering relation between said gaps and said couplings.

3. Apparatus as defined in claim 2, wherein said loading means further includes screw means for adjusting one roll toward the other.

4. Apparatus as defined in claim 1, wherein said jaws have toroidal peripheral grooves of cross-sectional contour conforming to that of said rod sections.

5. Apparatus for feeding sewer tool drive rod of the sectional type comprising rod sections joined by larger diameter couplings, said apparatus comprising: a pair of peripherally-opposed feed rolls having matching circumferentially grooved segmental-circular peripheral jaws for embracing rolling engagement with the rod sections, and having segmental peripheral gaps between the circumferential extremities of said jaws, said feed rolls having a circumference equivalent to a fraction of the sectional length of said drive rod between coupling centers, whereby succeeding couplings will register with and be received by said gaps as the rod is fed between said rolls; and means for driving said rolls.

6. Apparatus for feeding sewer tool drive rod of the sectional type comprising rod sections joined by larger diameter couplings, said apparatus comprising: a plurality of pairs of feed rolls having peripheries opposed along a common feed axis to which they are substantially tangent, said rolls having matching segmental-circular peripheral jaws arranged for rolling engagement with the rod sections, and having segmental peripheral gaps between the circumferential extremities of said jaws, the gaps of each succeeding pair of rolls being rotationally behind the gaps of the preceding pair of rolls to an extent which, at the peripheries of the jaws, is equivalent to the distance between succeeding roll centers, whereby a coupling will be received in successive pairs of gaps as it travels between successive pairs of rolls.

7. Feed mechanism as defined in claim 6, wherein said rolls are so proportioned to said drive rod that the length between coupling centers of the drive rod is a multiple of the circumference of said rolls.

8. Feed mechanism for sewer tool drive rod embodying rod sections joined by enlarged couplings, said feed mechanism comprising: a plurality of pairs of feed rolls engageable with said drive rod for feeding it longitudinally, said rolls having segmental, grooved peripheries, circumferentially matched for embracing, rolling reception of said rod sections, and gaps defined between the circumferential extremities of said segmental peripheries, said gaps being proportional and located to receive said couplings; and means for driving said rolls in timed relation.

9. Apparatus as defined in claim 6, the gaps of each succeeding pair of rolls being rotationally behind the gaps of the preceding pair of rolls to an extent which, at the peripheries of the jaws, is equivalent to the distance between succeeding roll centers, whereby a coupling will be received in successive pairs of gaps as it travels between successive pairs of rolls.

10. Feed mechanism as defined in claim 9, wherein said circumferential extremities are engageable with said couplings to transmit drive thereto.

11. Feed mechanism as defined in claim 10, wherein the rolls are arranged in two groups arranged in succession along the feed axis, the rolls of one group having driving engagement with one coupling while the rolls of the other group have driving engagement with a succeeding coupling in alternating timed relation to the driving engagement by said one group.

12. Apparatus as defined in claim 8, including loading means for pressing said jaws against said rod sections so as to cause said jaws to frictionally engage said rod sections with a non-slipping driving grip so as to maintain the registering relation between said gaps and said couplings.

13. Feed mechanism as defined in claim 8, wherein said rolls are provided with arcuately arranged gear teeth in the bottoms of said gaps and wherein said couplings are provided with rack teeth meshing with said gear teeth when a coupling is engaged in a gap.

14. A feed unit for feeding sewer tool drive rod of the sectional type comprising rod sections joined by larger diameter couplings, said apparatus comprising: a plurality of pairs of feed rolls engageable with said drive rod for feeding it longitudinally, said rolls having peripheries opposed along a common feed axis to which they are substantially tangent, said rolls having matching segmental-circular peripheral jaws provided with toroidal peripheral grooves arranged to receive the rod sections during travel thereof betwen the pairs of rolls, and having segmental peripheral gaps between the circumferential extremities of said jaws, the gaps of each succeeding pair of rolls being rotationaly behind the gaps of the preceding pair of rolls to a circumferential extent which, at the peripheries of the jaws, is equivalent to the distance between succeeding roll centers, whereby a counpling will be received in successive pairs of gaps as it travels between a pair of rolls; and means for driving said rolls in timed relation.

15. A feed unit as defined in claim 14, in combination with a feed reel having means to store the rod in coils and a throat through which the rod is fed, said feed unit being coupled to said throat with said throat coaxial with said feed axis, and fixedly associated with said reel for conjoint rotation about said feed axis.

16. A feed unit as defined in claim 14, including means for rotating said feed unit bodily around said feed axis independently of the rotation of said rolls, for rotating said rod and a tool driven thereby.

17. Apparatus as defined in claim 8, wherein there are two groups of rolls each including three pairs of closely spaced rolls having gaps that are similarly indexed in their respective groups but with the indexing in the second group so related to that of the first group as to provide for driving engagement of successive couplings by the respective groups, which driving engagement is alternated between the groups and betwen the successive couplings so as to provide continuous positive driving engagement of the drive rod.

18. Apparatus as defined in claim 8, including a drive rod having successive couplings elongated so as to bridge between succeeding pairs of rolls, the roll gaps having toothed bottoms and the couplings having toothed surfaces with geared meshing engagement with said toothed gap bottoms such as to provide continuous drive against a coupling bridged between successive rolls.

References Cited by the Examiner

UNITED STATES PATENTS

| | | | |
|---|---|---|---|
| 3,150,397 | 9/1964 | Caperton | 15—104.3 |
| 3,176,335 | 4/1965 | Ciaccio et al. | 15—104.3 |

FOREIGN PATENTS 533,688   9/1931   Germany.

CHARLES A. WILLMUTH, *Primary Examiner.*

E. L. ROBERTS, *Assistant Examiner.*